United States Patent
Kassel et al.

[15] 3,697,185
[45] Oct. 10, 1972

[54] METHOD AND APPARATUS FOR THE TIME SHARING OF MULTIPLE CHANNEL ANALYSIS MEANS

[72] Inventors: Aaron Kassel, Tarrytown; Donald F. Kopelman, New York, both of N.Y.

[73] Assignee: Technicon Instruments Corporation, Tarrytown, N.Y.

[22] Filed: Aug. 6, 1970

[21] Appl. No.: 61,582

[52] U.S. Cl. .................356/181, 356/188, 356/195, 356/205
[51] Int. Cl. ...........................G01j 3/46, G01n 21/22
[58] Field of Search......356/180, 181, 184, 186, 188, 356/195, 205, 208

[56] References Cited

UNITED STATES PATENTS

| | | | |
|---|---|---|---|
| 3,504,981 | 4/1970 | Malvin | 356/195 X |
| 2,594,514 | 4/1952 | Sweet | 356/205 |
| 3,241,432 | 3/1966 | Skeggs et al. | 356/181 X |
| 3,503,683 | 3/1970 | Isreeli et al. | 356/181 X |
| 3,379,094 | 4/1968 | Bertram | 356/226 |
| 3,480,786 | 11/1969 | Kottman | 250/227 X |
| 2,990,339 | 6/1961 | Frank et al. | 356/208 X |
| 3,447,876 | 6/1969 | Barringer | 356/188 |
| 3,487,225 | 12/1969 | Button | 356/205 |
| 3,520,624 | 7/1970 | Johnson et al. | 356/205 X |
| 2,773,414 | 12/1956 | Green | 356/205 X |
| 3,486,821 | 12/1969 | Westhaver | 356/226 X |
| 3,455,637 | 7/1969 | Howard | 356/205 X |
| 3,551,058 | 12/1970 | Dodds et al. | 356/188 X |

Primary Examiner—Ronald L. Wibert
Assistant Examiner—V. P. McGraw
Attorney—S. P. Tedesco

[57] ABSTRACT

New and improved method and apparatus for the time sharing of multiple channel fluid sample analysis means are provided and comprise operatively associated light source, light sensitive detector means, digital logic means, detector and logic means timing and control means, detector circuit means, multiple channel fluid sample analysis result read-out means and read-out means timing and control means, respectively, said detector means is constituted by a single light-sensitive detector means in the nature of a photomultiplier tube, and said detector circuit means comprises a single, temperature stabilized log diode and amplifier. An embodiment is disclosed wherein said light source is automatically and precisely tunable light source. In operation, the apparatus is effective to repeatedly scan said multiple channel analysis means and provide simultaneous recordings of the analysis results which are linear with regard to the respective fluid sample optical densities on said analysis result read-out means. The apparatus is applicable for use with multiple channel analysis means which include only colorimeters, and for use with multiple channel analysis means which include colorimeters and fluorimeters. The advantageous disposition of the analysis means on the manifold of operatively associated fluid sample supply and treatment means is also made possible by the apparatus of the invention.

13 Claims, 16 Drawing Figures

INVENTORS
AARON KASSEL
DONALD KOPELMAN
BY *James J. Romano, Jr.*
ATTORNEY

INVENTORS
AARON KASSEL
DONALD KOPELMAN
BY James J. Romano, Jr.
ATTORNEY

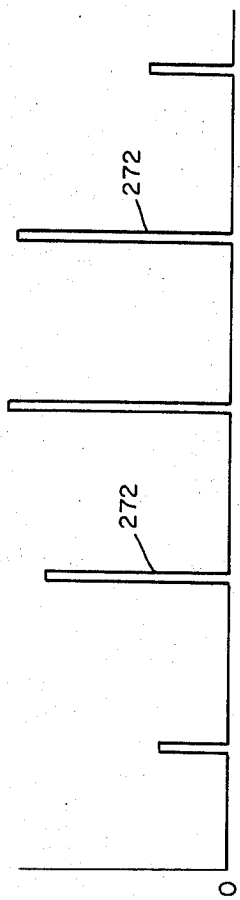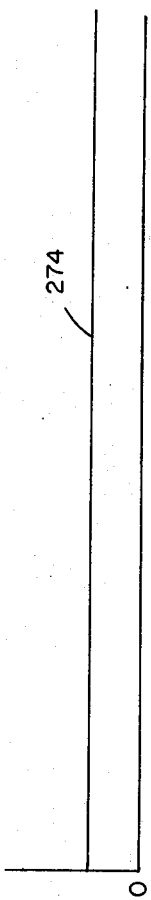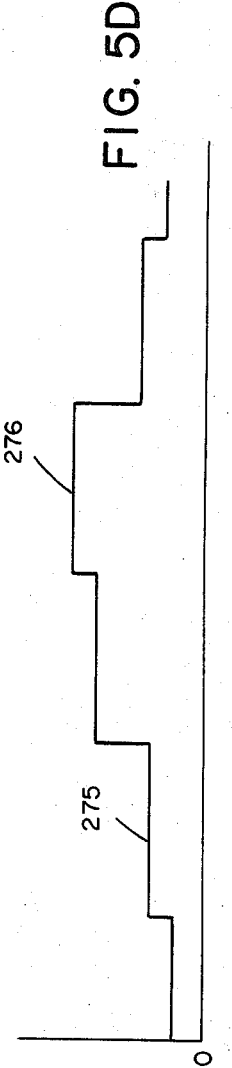

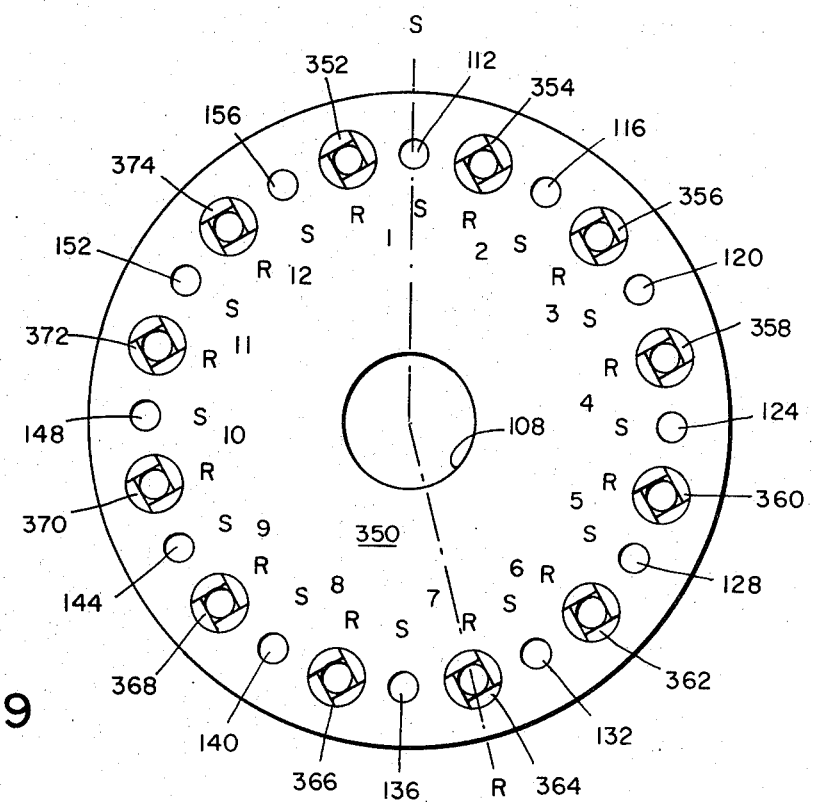
FIG. 9
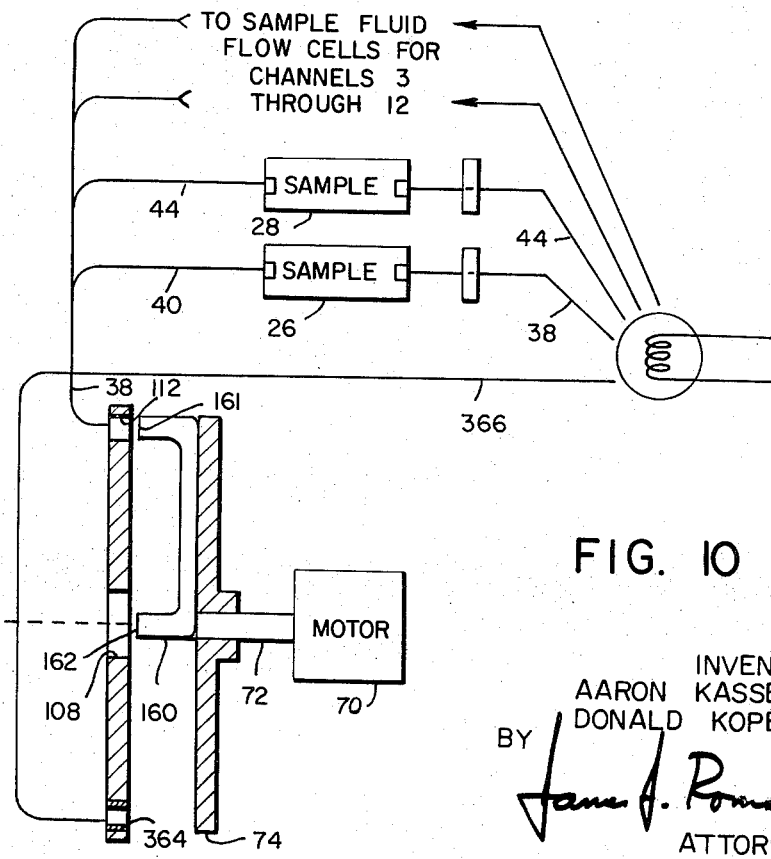
FIG. 10
INVENTORS
AARON KASSEL
DONALD KOPELMAN
ATTORNEY

METHOD AND APPARATUS FOR THE TIME SHARING OF MULTIPLE CHANNEL ANALYSIS MEANS

BACKGROUND OF THE INVENTION

1. Field of the Invention

This invention relates to new and improved method and apparatus for the time sharing of multiple channel analysis means.

2. Description of the Prior Art

Although apparatus for the time sharing of multiple channel analysis means in the nature, for example, of multiple channel colorimeters are known, the respective component requirements and component configurations thereof are such that the apparatus costs are unduly high, while the accuracy and reliability of operation thereof leave substantial room for improvement, and especially under relatively demanding operational conditions wherein the operational environment thereof cannot be closely controlled.

More specifically, such unduly high apparatus costs are due in part to the need for relatively expensive components in the nature of high quality D.C. amplifiers and precisely regulated power supplies, and the requisite repetition thereof and of other components in the nature of log diodes, operating and detecting circuits, appropriate optical elements, photo-detection elements, and manually adjustable apertures and the like to enable adjustment for differing light energy levels.

Too, in many instances, the relevant apparatus of the prior art require a precisely temperature controlled environment for accurate and reliable operation, and it is believed clear that the provision of the same can prove very expensive and quite unwieldy. In addition, many of the relevant apparatus of the prior art provide the results of the analyses performed thereby in the form of log functions to thus increase the cost of recording the same and render the interpretation thereof somewhat more involved.

Also, the fact that many of the relevant methods and apparatus of the prior art are not adaptable for use with multiple channel analysis means which comprise different forms of analysis means and are not, in any event, readily modifiable for use with multiple channel analysis means having differing numbers of analysis channels.

Further, and in instances wherein said prior art multiple channel analysis apparatus take the form of a multiple channel colorimeter having a plurality of flow cells for utilization in operative conjunction with automatic fluid sample supply and treatment means in the nature of those shown and described in U.S. Pat. No. 3,241,432 issued Mar. 22, 1966 to Leonard T. Skeggs et al. and assigned to the assignee hereof, the disposition of said flow cells at locations remote from the manifold of said fluid sample supply and treatment means with attendant requirement for relatively long hydraulic and electrical connections therebetween give rise to additional increases in apparatus costs and difficulties in providing for accurate and reliable operation thereof.

OBJECTS OF THE INVENTION

It is, accordingly, an object of this invention to provide new and improved method and apparatus for the time sharing of multiple channel analysis means which are of relatively low cost and which embody a high degree of accuracy and reliability of operation.

Another object of this invention is the provision of method and apparatus, as above, which are accurately and reliably operable independent of ambient temperature changes within a reasonable range of the latter.

Another object of this invention is the provision of method and apparatus, as above, which provide for analysis results in a more direct, less costly and more interpretable form.

Another object of this invention is the provision of method and apparatus, as above, which are adaptable for use with multiple channel analysis means which include more than one form of analysis means.

Another object of this invention is a provision of method and apparatus, as above, which are of significant versatility in that the same may be readily modified for operation with a variety of multiple channel analysis means having differing numbers of analysis channels.

Another object of this invention is the provision of apparatus, as above, which require the use of only readily available components of proven dependability in the fabrication thereof to provide for long periods of satisfactory, substantially maintenance-free apparatus operation.

A further object of this invention is the provision of method and apparatus, as above, which, when utilized with multiple channel, fluid sample colorimetric or similar analysis means having fluid sample flow cells, enable the disposition of said flow cells at optimum locations relative to the fluid sample supply and treatment means which supply said fluid samples thereto.

A farther object of this invention is the provision of method and apparatus, as above, which are particularly adaptable to the time sharing of multiple channel colorimetric analysis means for the colorimetric analysis of a plurality of blood sample quotients as are supplied thereto from blood sample supply and treatment means of the type disclosed in said U.S. Pat. No. 3,241,432.

SUMMARY OF THE INVENTION

As disclosed herein for use with multiple channel, fluid sample analysis means, the apparatus of the invention generally comprise operatively associated light sensitive detector means, digital logic means, detector and logic means timing and control means, detector circuit means, multiple channel fluid sample analysis result read-out means and read-out means timing and control means, respectively. In operation, as more specifically described, light from a common source is routed by light pipes to and through the respective analysis means channel flow cells, and therefrom to a stationary light transmission directing disc. A rotating light pipe scanner scans said disc and transmits the light therefrom in sequence to a single photomultiplier tube. Concomitantly, a rotating timing disc provides analysis channel indicia through fiber optic photo-cell reader means to the digital logic means of the light being transmitted at any given point in time to the photomultiplier tube. The resultant output currents from the photomultiplier tube are applied in sequence across a single log diode, amplified by appropriate amplifier means, and applied as voltage signals from the latter to the read-out means timing and control means. Temperature stabilization means are provided to render the operation of said log diode and said amplifier means substantially independent of ambient temperature changes. Concomitantly with the application of said voltage signals to said read-out means timing and control means, digital signals are applied thereto from said digital logic means and are effective to operate the former in accordance with said analysis channel indicia to activate the appropriate channel of the read-out means and provide an accurate, readily reproducible recording of the analysis results which is linear with fluid sample optical density. In one disclosed embodiment, all of said analysis means channels are constituted by colorimetric analysis means while, in other disclosed embodiments, said analysis means channels may comprise both colorimetric and fluorimetric analysis means. An embodiment is disclosed which requires the operative positioning of single fiber optic or light pipe means, only. relative to said light source to provide for increased optical efficiency, and an embodiment is disclosed which utilizes an automatically turnable light source to enable the elimination of optical filters, simplification of said light sensitive detector means, and provide for even greater increase in optical efficiency.

A specific application of the apparatus of the invention to fluid sample supply and treatment apparatus of the type shown and described in U.S. Pat. No. 3,241,432 is disclosed which makes possible the advantageous disposition of the analysis means flow cells directly on the supply and treatment apparatus manifold to thus minimize the requisite hydraulic and electrical path lengths.

DESCRIPTION OF THE DRAWINGS

The above and other objects and significant advantages of this invention are believed made clear by the following detailed description thereof taken in conjunction with the accompanying drawings wherein:

FIGS. 5A through 5D are timing diagrams illustrating the operation of the apparatus of FIG. 1;

FIG. 9 is a front plan view of a modified form of the stationary light transmission directing disc of the invention;

FIG. 10 is a generally schematic diagram of the apparatus of FIG. 1 utilizing the modified form of stationary light transmission directing disc of FIG. 9;

DETAILED DESCRIPtion of the invention

Figure 1:
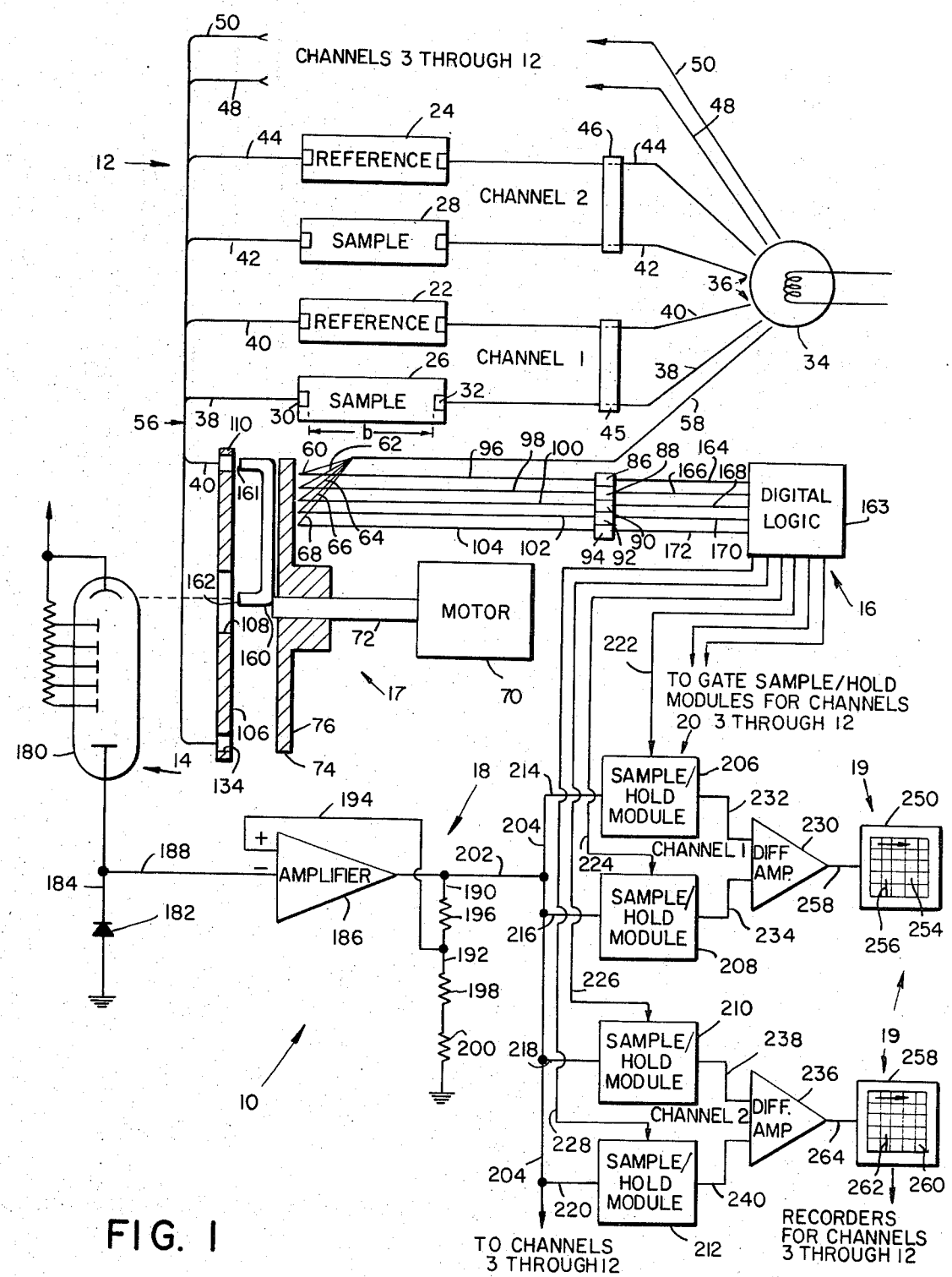
FIG. 1 is a generally schematic diagram of a first embodiment of apparatus constructed in accordance with the teachings of this invention.

New and improved apparatus for the time sharing of fluid sample analysis means constructed and operative in accordance with the teachings of our invention are indicated generally at 10 in FIG. 1 and may be seen to comprise colorimetric fluid sample analysis means as indicated generally at 12, light sensitive detector means as indicated generally at 14, digital logic means as indicated generally at 16, detector and logic means timing and control means as indicated generally at 17, detector circuit means as indicated generally at 18, fluid sample analysis result read-out means as indicated generally at 19, and read-out means timing and control means as indicated generally at 20, which are respectively operatively arranged as shown.

The fluid sample analysis means 12 comprise reference fluid flow cells 22 and 24, and sample fluid flow cells 26 and 28, and each of said flow cells may take the form, for example, of that shown and described in U.S. Pat. No. 3,345,910 issued Oct. 10, 1967 to Seymour Rosin, et al. and assigned to the assignee hereof. As such, it may be understood that each of said flow cells will have a fluid flow path which forms a light path of precisely predetermined length b formed therein to extend therethrough between opposed, transparent flow cell end walls as specifically identified at 30 and 32 for sample fluid flow cell 26, only.

The respective reference and sample fluid flow cells are operatively arranged in pairs to form colorimetric fluid sample analysis channels. More specifically, it may be understood that sample fluid flow cell 26 and reference fluid flow cell 22 are operatively arranged to form colorimetric analysis channel 1 as indicated, while sample fluid flow cell 28 and reference fluid flow cell 24 are likewise operatively arranged to form colorimetric analysis channel 2 as indicated. For use as described in detail hereinbelow in the substantially simultaneously, automatic colorimetric analysis of a series of fluid samples with regard to 12 distinct constituents of each of said samples, it may be understood that 12 of such colorimetric fluid sample analysis channels would be provided which would, of course, require the provision of an additional 20, non-illustrated flow cells to provide the additional channels 3 through 12 as clearly indicated in FIG. 1.

Further included in the fluid sample colorimetric analysis means 12 is a suitable light source 34 which is, of course, arranged to be energized from any suitable, nonillustrated source of appropriate electrical power. Since, the apparatus 10 is operative at relatively high optical efficiency, the light source 34 may take a simpler form than that normally required for colorimetric analysis, and may be operated at a lower voltage, for longer lamp life, from relative simple power supply means to thus eliminate the need for a relatively expensive regulated lamp power supply, all to significant advantage as should be obvious.

Suitable light transmission means are indicated generally at 36 and are provided to transmit the light from the light source 34 for passage through the light paths of each of the provided flow cells and, upon exit therefrom, to transmit said light to the detector means timing and control means 16 for transmission from the latter to the light sensitive detector means 14. More specifically, said light transmission means 36 may be understood to take the form of suitable fiber optic means and, as depicted in FIG. 1, may readily be seen to comprise a light pipe 38 which extends as shown from the light source 34 to transmit the light therefrom through sample fluid flow cell 26 of colorimetric analysis channel 1, a light pipe 40 which extends as shown from said light source to transmit the light therefrom through reference fluid flow cell 22 of colorimetric analysis channel 1, a light pipe 42 which extends as shown from said light source to transmit the light therefromthrough sample fluid flow cell 28 of colorimetric analysis channel 2, and a light pipe 44 which extends as shown from said light source to transmit the light therefrom through reference fluid flow cell 24 of colorimetric analysis channel 2. The light pipes which function to transmit the light from light source 34 to and through the respective non-illustrated reference and sample fluid flow cells of the remaining colorimetric analysis channels 3 through 12 are generally illustrated by light pipes 48 and 50.

An optical filter 45, having a bandpass which is appropriate to the colorimetric quantitative determination of the fluid sample constituent of interest with regard to colorimetric analysis channel 1, is interposed as shown in the respective light pipes 38 and 40 of said colorimetric analysis channel; while an optical filter 46, having a bandpass which is appropriate to the colorimetric quantitative determination of the fluid constituent sample of interest with regard to colorimetric analysis channel 2 is disposed as shown in the light pipes 42 and 44 of said colorimetric analysis channel. In like manner, it may be understood that an optical filter having a bandpass which is appropriate, in each instance, to the fluid sample constituent of interest with regard to the remaining, non-illustrated colorimetric analysis channels 3 through 12, is interposed as described in the respective light pipe paths thereof.

All of the provided light pipes are collected as shown at the respective light exit ends of the provided flow cells into a fiber-optic or light pipe bundle 56 which in turn extends, as shown, into operative relationship with the detector and logic means timing and control means 17. Further included in light transmission means 36 is a light pipe or fiber-optic bundle 58 comprising light pipes 60, 62, 64, 66 and 68 which respectively extend as a bundle from the light source 34 to diverge therefrom as shown adjacent the respective light exit extremities thereof at the detector and logic means timing and control means 17.

Figure 3:
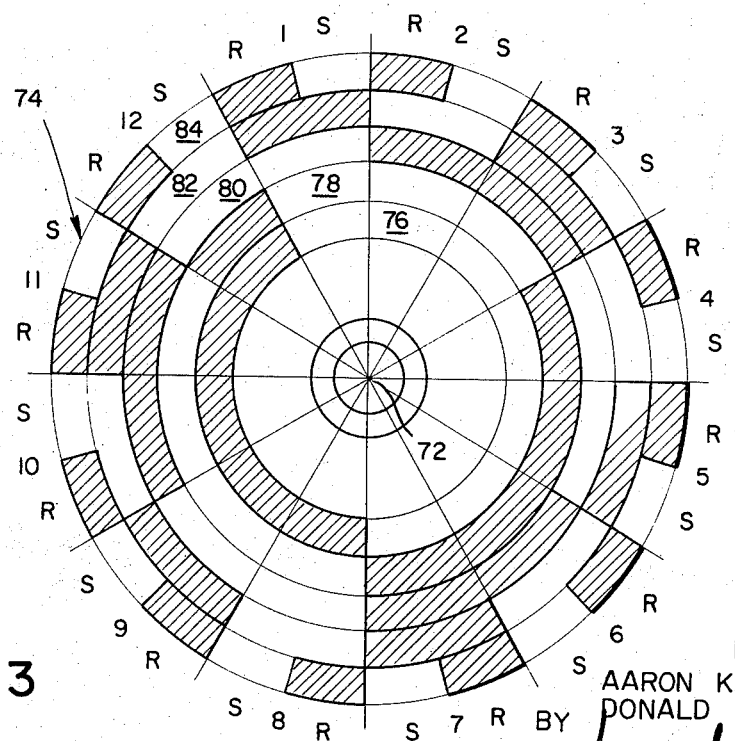
FIG. 3 is a rear plan view of the rotating timing disc of FIG. 1.

Referring now to the detector and logic means timing and control means 17, the same may be seen to comprise a constant speed, electric drive motor 70 having a drive shaft 72 which may be arranged, for example, to rotate at a constant 1,800 rpm. A rotating timing disc 74 is affixed as indicated to the motor drive shaft 72 adjacent the remote extremity thereof so as to be rotateable therewith. As best seen in FIG. 3, the rear surface 76 of the timing disc 74 is binary coded through appropriate treatment of said disc surface to provide for portions or areas thereon which are substantially light reflective, and portions or areas thereon which are substantially light absorbtive or non-reflective. More specifically, and for use as disclosed herein with automatic fluid sample colorimetric analysis means including twelve colorimetric analysis channels, the timing disc surface of interest may be seen to be divided into five, generally circular concentric bands as indicated at 76, 78, 80, 82, and 84, respectively. The said bands are in turn respectively divided radially as shown into 12 band portions as indicated at 1 through 12 to provide one of said band portions for each of said colorimetric analysis channels, and said band portions are in turn each radially divided as shown into a reference fluid band portion and a sample fluid band portion as indicated in each instance at R and S respectively.

If, in each instance, treatment of said timing disc surface to render the same substantially light absorbtive or non-reflective is considered to constitute a bit, it may be seen, for example, that bits are provided in the reference fluid band portions of bands 82 and 84 of the colorimetric analysis channel bank portion I, and that a bit is provided in the sample fluid band portion of band 82, only, of the colorimetric analysis channel band portion 1. In like manner, it may be seen that bits are provided in the reference fluid band portion of bands 76 and 84 of the band portion for colorimetric analysis channel 8, while a bit is provided in the sample fluid band portion of band 76, only, for this colorimetric analysis channel 8 band portion. By the above is believed made clear that the light reflective characteristic of each of the colorimetric analysis channel band portions formed on the disc surface 74 may be effective to identify not only a different one of said colorimetric analysis channels, but to also identify the respective reference or sample fluid band portion of said colorimetric analysis channel band portions.

Referring again to the fiber-optic or light pipe bundle 58 which functions to transmit the light from the light source 34 to the timing disc 74, it may be understood that the respective light exit ends of the light pipes 60, 62, 64, 66 and 68 are arranged in substantially radial alignment relative to said disc surface with the light exit end of light pipe 60 being arranged to illuminate an appropriately sized and configured spot on timing disc band 84, the light exit end of light pipe 62 being arranged to illuminate a like spot on timing disc band 82, the light exit end of light pipe 64 being arranged to illuminate a like spot on timing disc band 80, the light exit end of light pipe 66 being arranged to illuminate a like spot on timing disc band 78, and the light exit end of light pipe 68 being arranged to illuminate a like spot on timing disc band 76.

Further included in the detector and logic means timing and control means 17 are a plurality of photosensitive devices which may, for example, take the form of silicon photocells, as indicated at 86, 88, 90, 92 and 94, respectively. A light pipe 96 extends, as shown, to transmit the light, if any, reflected from the spot illuminated on band 84 of the timing disc 74 by light pipe 60 for impingement upon the silicon photocell 86, while a light pipe 98 extends, as shown, to transmit the light, if any, reflected from the spot illuminated on timing disc band 82 by light pipe 62 for impingement upon the silicon photocell 88. In like manner, light pipes 100, 102 and 104 are provided to extend, as shown, to transmit the light, if any, reflected from the illuminated spots on the respective timing disc bands 80, 78 and 76 for impingement upon the respective silicon photocells 90, 92 and 94.

By the above described arrangement of the timing disc 74, the respective silicon photocells 86, 88, 90, 92 and 94, and the relevant light pipes, the position of the rotating timing disc 74 at any point in time may be precisely indicated by which of said silicon photocells is energized at said point in time. More specifically, with the timing disc 74 rotating through the position thereof wherein the respective sample fluid band portions of the colorimetric analysis channel 1 band portion are aligned with the respective light exit ends of the light pipes 60, 62, 64, 66 and 68, each of the silicon photocells 86, 90, 92 and 94, only, will be energized. With the timing disc 74 rotating through the position thereof in which the reference band portions of the colorimetric analysis channel 2 band portion are aligned for spot illumination from the respective light exists ends of said light pipes, silicon photocells 88, 92, and 94, only, will be energized.

Figure 2:
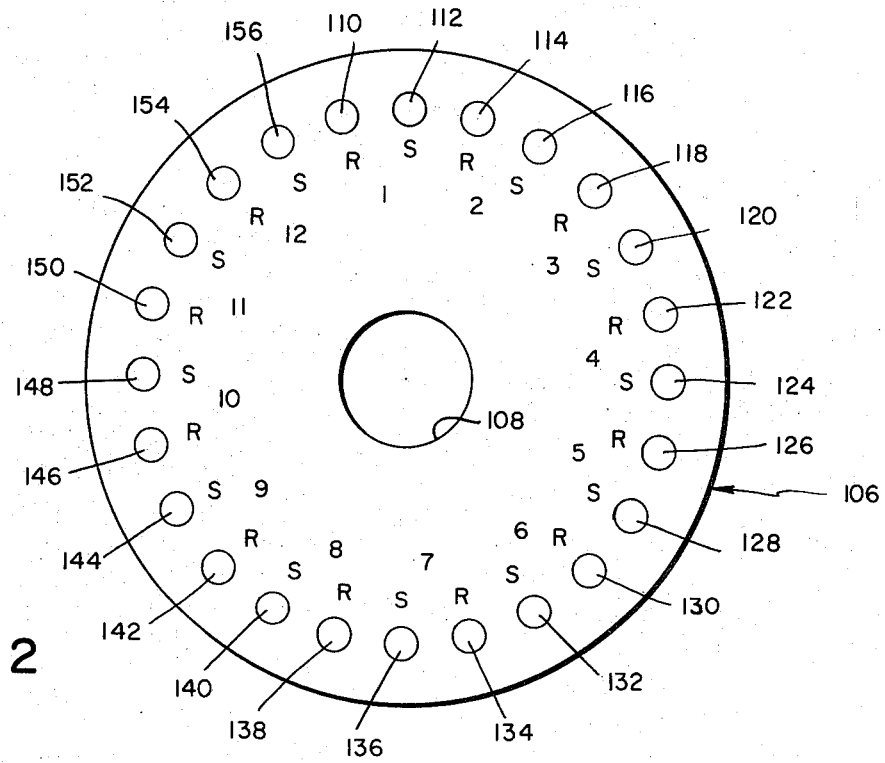
FIG. 2 is a front plan view of the stationary light transmission disc of FIG. 1.

Further included in the detector and logic means timing and control means 17 is a stationary light transmission directing disc 106 which, as best seen in FIGS. 1 and 2, comprises a relatively large light transmission aperture 108 formed generally centrally thereof, and a generally circular array of equally spaced light transmission directing apertures formed radially outwardly thereof adjacent the stationary disc periphery. For use in disclosed herein with colorimetric analysis means having 12 colorimetric analysis channels, said generally circular array of light transmission directing apertures will be constituted by 24 of the same as indicated at 110 through 156 in FIG. 3.

The light pipes from the respective reference and sample fluid flow cells of the colorimetric analysis channels 1 through 12 which constitute the light pipe bundle 56 are respectively arranged so that the light exit ends thereof are each in substantial alignment with a corresponding one of the light transmission directing apertures 110 through 156, so that the light exiting from each of said flow cells will be transmitted to a different one of said light transmission directing apertures. More specifically, and with regard to the illustrated flow cells 22, 26, 28, and 24, light pipe 40 extends to transmit the light from reference fluid flow cell 22 of channel 1 to light transmission directing aperture 110, light pipe 38 extends to transmit the light from sample fluid flow cell 26 of channel 1 to light transmission directing aperture 112, light pipe 44 extends to direct the light from reference fluid flow cell 24 of channel 2 to light transmission directing aperture 114, while light pipe 42 extends to direct the light from sample fluid flow cell 28 of channel 2 to light transmission directing aperture 116. Each of the light pipes from the respective reference and sample flow cells of the remaining, non-illustrated colorimetric analysis channels 3 through 12 may be understood to extend in like manner into operative relationship with a different one of the remaining light transmission directing aperture of the stationary disc 106, and the exact order of light pipe light transmission directing aperture registration is indicated by the appropriate reference and sample colorimetric analysis channel designations as are provided on the light transmission directing disc 106 in FIG. 2.

A generally V-shaped fiber optic light pipe scanner is indicated at 160 in FIG. 1 and is affixed as indicated to the end of motor drive shaft 72, so as to be rotateable therewith in synchronism with the rotating timing disc 74. As disclosed herein, the light pipe scanner 160 is effective to scan the respective light transmission directing apertures 110 through 156 of the stationary light transmission directing disc 106 at a rate of 30 times per second, and to transmit the light therefrom in appropriate sequence to the light sensitive detector means 14, as indicated by the dashed line extending therebetween. Each rotation of the rotating light pipe scanner 160 is effective to transmit the light from the respective reference and sample flow cells of colorimetric analysis channels 1 through 12 in reference-and-sample-flow-cell alternating sequence as a series of light pulses to the said detecting means.

To better illustrate this, it may be seen that with the respective stationary light transmission directing disc 106 and the rotating light pipe scanner 160 relatively positioned as depicted in FIG. 1 to align the light input end 161 of the latter with light transmission directing aperture 110, the light from reference flow cell 22 of colorimetric analysis channel 1, which is transmitted to the disc on light pipe 40, will be transmitted therefrom through said light transmission directing aperture and, from the latter, by said light pipe scanner to the light sensitive detector means 14; while, with said light pipe scanner rotated through approximately 180° to align the light input end 161 thereof with the light transmission directing aperture 136 of the disc 106, the light from the non-illustrated sample flow cell of the colorimetric analysis channel 7 which may be assumed to be transmitted to said disc on light pipe 50, will be transmitted therefrom in turn through the light pipe scanner 160 for impingement upon said detector means.

Referring now to the digital logic means 16, the same comprises a series of switching networks of appropriate, passively operated electronic components in the nature of diode networks as indicated schematically at 163 which are operable in response to the optical outputs generated by rotation as described of the timing disc 74, as transduced into electrical outputs by the respective silicon photocells 86, 88, 90, 92 and 94, to provide appropriate gating signal inputs to the read-out means operating circuit means 20 to control the operation of the latter as described in detail hereinbelow. To this effect, lines as indicated at 164, 166, 168, 170 and 172 direct the electrical outputs of the respective silicon photocells as electrical inputs to said logic means to thus indicate to the latter the precise position of the rotating timing disc 74, and accordingly of the rotating light pipe scanner 160, at any given point in time.

By the above described arrangement of the respective stationary light transmission directing disc 106, the rotating timing disc 74, the rotating light pipe scanner 160 and the synchronous rotation thereof with said timing disc, all of the described light pipes, the respective silicon photocells 86, 88, 90, 92, and 94, and the operative connection thereof as described to the digital logic means 16, the precise identity of the light impinging at any given point in time upon the light sensitive detector means 14 insofar as the specific flow cell through which the same has been passed is concerned, will be applied in the form of an appropriate electrical input signal to the digital logic means 16 concomitantly with the impingement of said light on said detector means. More specifically, and with these components arranged as depicted in FIG. 1, the impingement of the light from reference fluid flow cell 22 of colorimetric analysis channel 1 upon the detector means 14 will be accompanied by the concomitant energization of silicon photocells 90, 92, and 94, only, with attendant application of the electrical outputs therefrom as electrical input signals on line 168, 170 and 172 to the digital logic means 16 to positively identify this particular reference fluid flow cell 22 thereto. In like manner, with the light pipe scanner 160 rotated through approximately 40° from the position thereof depicted in FIG. 1 to align the light inlet end 161 thereof with light transmission directing aperture 116 of the stationary disc 106 to transmit the light from sample fluid flow cell 28 of colorimetric analysis channel 2 to the detector means 14, the precise identify of this flow cell, only, will be positively identified to the digital logic means 16 by the application of electrical inputs thereto on lines 164, 166, 170 and 172, only.

Referring now to the light sensitive detector means 14, the same may comprise a single photomultiplier tube 180 which may, for example take the form of that designated 4477 as manufactured and marketed by the Radio Corporation of America of Princeton, N.J., which is energized as indicated from any suitable source of negative input voltage. A particular advantage of the apparatus of the invention resides, of course, in the fact that the detection of the analysis results from a plurality of colorimetric analysis channels through the use of one light sensitive detecting means, only, is made possible. Of additional advantage with regard to the use of a photomultiplier tube in the light sensitive detector means 14 as opposed, for example, to the more conventional use of photosensitive devices in the nature of photoelectric cells or the like in colorimetric analysis apparatus, resides in the fact that since the gain of the photomultiplier tube 180 is dependent primarily on, or proportional to, the input voltage, the said gain will be maintained relatively constant over the relatively short reference-sample interval through appropriate control of said input voltage. This is to say that although the gain of the photomultiplier tube 180 may vary over relatively long time periods, the linearity of the photomultiplier tube output will not be significantly affected. Thus, the use of a relatively expensive, highly regulated power supply for said photomultiplier tube is not required.

Referring now to the detector circuit means 18, the same may comprise a log diode 182 connected as shown in line 184 at the output side of the photomultiplier tube 180, and a high input impedance amplifier 186 connected as shown in series with the log diode 182 by line 188. The amplifier 186 preferably exhibits a high input impedance and, as such, will preferably take the form of a FET follower, although amplifiers having other and different configurations may, of course, be utilized.

A temperature stabilized resistance network is connected as shown across the amplifier 186 by lines 190, 192 and 194, and comprises resistors 196 and 198, and a temperature sensitive resistor 200 connected as shown in series in lines 190 and 192. As a result of this provision of the temperature stabilized resistance network, it may be understood that the temperature-dependent transfer function of the amplifier 186 and the temperature term in the equation for the voltage across the log diode 182, as discussed in greater detail hereinbelow, will respectively appear in the numerator and denominator of such equation to effectively cancel each other out to thereby render the operation of the log diode 182 and the amplifier 186 substantially independent of ambient temperature change.

As arranged and utilized herein, the log diode 182 and amplifier 186 are arranged to provide an output voltage signal Vo on line 202, for application as described in detail hereinbelow to the read-out means operating circuit means 20, which is directly proportional to the concentration C of the fluid sample constituent of interest in each instance. More specifically, and considering for example the sample fluid flow cell 26 of colorimetric analysis channel 1, it may be understood that the relationship between the incident radiation applied thereto from light source 34 on light pipe 38, and the exit radiation applied therefrom by said light pipe to the rotating light pipe scanner 160 and, from the latter, to the photomultiplier tube 180 as described in detail hereinabove, may be defined in accordance with Behr's law as follows:

EQUATION 1. $P = Po10^{-abC}$ wherein $P$ equals the exit radiation, $Po$ equals the incident radiation, $a$ equals the light absorbtivity of the fluid sample of interest, $b$ equals the flow cell light path length, and $C$ equals the concentration of the constituent of interest.

In like manner, the relationship between this exit radiation from the flow cell as applied to the photomultiplier tube 180, and the output current from the latter, may be expressed as follows:

EQUATION 2.

$$I = K_1 P$$

wherein $I$ is the photomultiplier tube output current, $P$ is the exit radiation, and $K_1$ is a constant of the photomultiplier tube which is determined in large measure by the conversion efficiency and gain thereof.

The voltage drop across the log diode 182 which results from the application of the photomultiplier tube output current thereto may be defined as follows:

EQUATION 3.

$$Vo = KT/Q^{\log}(K_1 Po10^{-abC}/Io)$$

wherein $Vo$ is said voltage drop, $K$ equals Boltzman's constant, $T$ equals absolute temperature in degrees centigrade, $Q$ is the constant charge of an electron, and Io is a constant as determined by the characteristics of said log diode.

From the above, the equation for the voltage drop across the log diode 182 can be rewritten as follows:

EQUATION 4.

$$Vo = KT/Q^{log}(I/Io)$$

More specifically, the voltage Vs across the log diode 182 which results from impingement of the exit radiation P from a sample fluid flow cell in the nature of 26 and 28 upon the active surface of the photomultiplier tube 180 to generate a photomultiplier tube sample output current Is, may be expressed as follows:

EQUATION 5.

$$Vs = KT/Q^{log}(Is/Io)$$

In like manner, the voltage $Vr$ across said diode which results from the impingement of the exit radiation P from a reference fluid flow cell such as 22 and 24 upon the active surface of the photomultiplier tube 180 to generate a photomultiplier tube reference output current Ir may be expressed as follows:

EQUATION 6.

$$Vr = KT/Q^{log}(Ir/Io)$$

As a result of the above, the Voltage $Vs$ generated as described in Equation 5 in response to the application of the photomultiplier tube output current $Is$ thereto will be directly proportional to the concentration C of the constituent of interest in the fluid sample then being colorimetrically analyzed. In like manner, the voltage $Vr$ across the log diode 182 which is generated as described in Equation 6 in response to the application of the photomultiplier tube output current $Ir$ thereto, will also be directly proportional to the known concentration in the reference fluid of interest. In addition to the provision of these log diode voltages which are directly proportional in each instance to the respective sample and reference fluid concentrations such voltages will, in each instance, be substantially independent of ambient temperature changes as a result of the provision, as described, of the temperature stabilization resistance network across the amplifier 186.

The alternating appearance across the log diode 182 of reference and sample voltages $Vr$ and $Vs$ which will respectively be indicative of the results of the colorimetric analyses effected in colorimetric analysis channels 1 through 12, and will appear in that order, will result in the application of said voltages on line 188 to the amplifier 186, the amplification thereof by the same, and the subsequent provision thereof as amplifier output voltages for application to the read-out means operating circuit means 20.

A particular advantage of the use of detector circuit means 18 configured and operative, as described, to require the use of a single log diode 182, to perform a dual function in providing both the reference voltage $Vr$ and the sample voltage $Vs$ as separated in time through the time sharing of the said log diode, resides in the fact that the same eliminates the need for the use of a matched pair of log diodes having precisely matched scale factors to significant operational and economic advantage as should be readily apparent to those skilled in this art. A further significant advantage of the use of detector circuit means 18 configured to utilize amplifier 186 substantially as a straight voltage amplifier resides in the fact that concern need not be given to the current noise characteristics of the latter to thus eliminate the difficult requirement for the provision of an amplifier having both good voltage and current noise characteristics.

Referring now to the read-out means operating circuit means 20, the respective components thereof are specifically illustrated for the readout of the results of the colorimetric analyses effected in channels 1 and 2 only. A common operating circuit voltage signal input line or bus bar is is indicated at 204, and sample/hold modules 206, 208, 210 and 212 are connected thereto as shown by voltage signal input lines 214, 216, 218 and 220, it being understood that sample/hold modules 206 and 208 are operative, as indicated, for colorimetric analysis channel 1, while sample/hold modules 210 and 212 are operative, as indicated, for colorimetric analysis channel 2. The respective sample/hold modules 206, 208, 210 and 212 are gated, as indicated, from the digital logic means 16 through the provision of mode-control logic input signals to said sample/hold modules from said logic means on lines 222, 224, 226 and 228, respectively.

As utilized herein, the respective sample/hold modules 206, 208, 210 and 212 may each be understood to be effective to acquire and track the appropriate analog input signals which are constituted by the respective reference and sample amplifier output voltages $Vr$ and $Vs$, and applied on the respective operating circuit voltage signal input lines, and to hold the respective instantaneous values of said analog input signals or reference and sample voltages upon command of the mode-control logic inputs from the digital logic means 16.

Each of said sample/hold modules may, for example, take the form of that manufactured and marketed by the Burr-Brown Research Corporation of Tuscon, Arizona as the Model 4034/25 sample/hold module. This particular sample/hold module comprises a unity-gain noninverting device which is particularly designed for medium-speed applications of the nature under discussion herein. In the sample mode, this module will track the analog input signal and, when switched to the hold mode, will function to hold substantially constant the value of said analog input signal at the time of such switching. A particular advantage of the use of this module resides in the fact that no external components are required and that the operation thereof may be readily effected through a simple application of ±15 volts DC power thereto.

Further included in the read-out means operating circuit for colorimetric analysis channel 1 is a differential amplifier 230, and lines 232 and 234 are provided as shown to apply the respective output signals from the channel 1 sample/hold modules 206 and 208 as input signals to said differential amplifier. In like manner, a differential amplifier is indicated at 236 for colorimetric analysis channel 2, and lines 238 and 240 are provided as shown to apply the respective output signals from the channel 2 sample/hold modules 210 and 212 as inputs to this differential amplifier.

Referring now to the read-out means 19, the same are constituted by appropriate colorimetric analysis results recording means which are provided for each colorimetric analysis channel. More specifically, and for colorimetric analysis channel 1, said read-out means may comprise a strip chart recorder 250 which may, for example, take the form of the DC, null-balance type recorder shown and described in said U.S. Pat. No. 3,241,432 which includes a strip chart 254 which is movable in the indicated direction, and a recording pen or stylus 256 which is operable to graph the results of the operation of the colorimetric fluid sample analysis performed in colormetric analysis channel 1. A line 258 is provided to apply the output from the differential amplifier 230 as the recorder operating input to the strip chart recorder 250 for operation of the latter as described in greater detail hereinbelow.

A strip chart recorder of like construction and manner of operation is indicated at 258 and includes a moveable strip chart 260 and a recording pen or stylus 262 which is operable to graph the results of the operation of the colorimetric fluid sample analysis performed in colorimetric analysis channel 2. To this effect, a line 264 is provided to apply the output from the differential amplifier 236 as the recorder operating input to the strip chart recorder 258. Although not specifically illustrated, appropriate recorder means in the nature of the strip chart recorders 250 and 258 are included in the read-out means 18 for each of the ten remaining colorimetric analysis channels 3 through 12.

OPERATION

In operation for use, for example, in the automatic sequential determination through colorimetric quantitative analysis of a plurality of different constituents, such as uric acid, glucose, blood urea nitrogen, billirubin, direct cholesterol, $PO_4$, total and direct billirubin, albumin, LDH, creatinine, total protein and SGOT, respectively, of a series of appropriately treated blood sample quotients which are supplied thereto from sequentially operable fluid sample supply and treatment means in the nature of those disclosed in said U.S. pat. No. 3,241,432, the apparatus of the invention would be arranged so that the quotients of each of said blood samples, each of which had been treated in a manner appropriate to the colorimetric quantitative analysis thereof with respect to a different blood sample constituent of interest, are supplied in synchronism to the respective fluid sample flow cells for substantially concomitant flow therethrough.

Figure 4A:
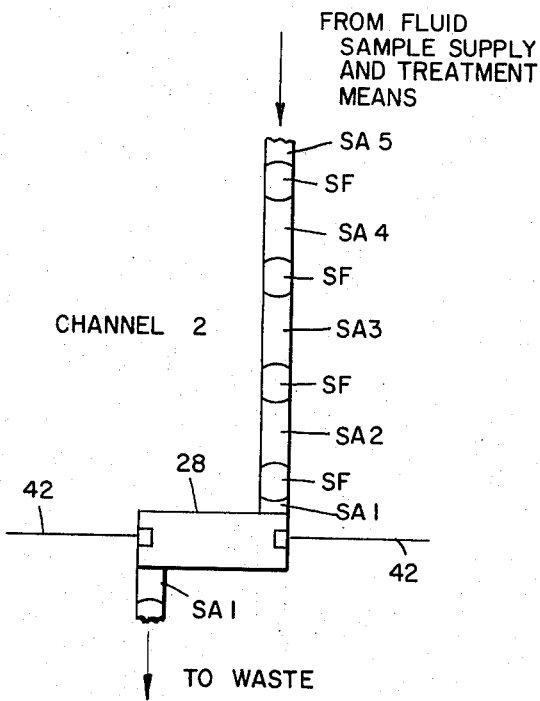
FIGS. 4A and 4B are flow diagrams depicting the simultaneous flow of sample fluid quotients through the sample fluid flow cells of FIG. 1.
Figure 4B:
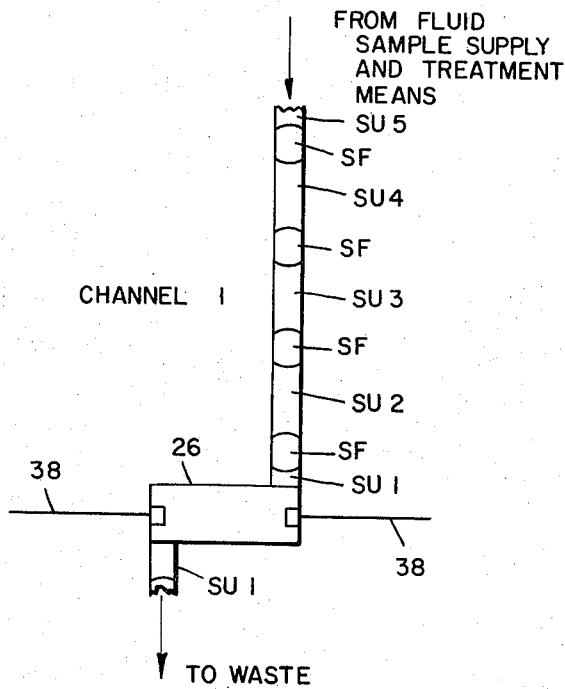

More specifically, and as illustrated by way of example in FIG. 4B, it may be seen that a series of blood sample quotients as indicated at SU1 through SU5, each of which had been treated in said fluid sample supply and treatment means for colorimetric quantitative analysis thereof with regard to the uric acid constituent thereof, and as separated, each from the other, by a segment of a suitable separating fluid SF, would be supplied as indicated for series flow through sample fluid flow cell 26 of colorimetric analysis channel 1. As shown in FIG. 4A, a similarly configured and dimensioned stream of a series of blood sample quotients SA1 through Sa5, each of which had been appropriately treated in said fluid sample supply and treatment means for colorimetric analysis thereof relative to the albumin constituent thereof, would be concomitantly supplied for flow through sample fluid flow cell 28 of colorimetric analysis channel 2. In like manner, similarly configured streams of series of blood sample quotients, each of which had been appropriately treated for colorimetric analysis thereof with regard to a different constituent of each of the blood samples, would be concomitantly flowed in substantially identical phase relationship through the remaining, non-illustrated sample fluid flow cells of the remaining colorimetric analysis channels 3 through 12.

Concomitantly with the flow as described of the respective blood sample quotient streams through the respective sample fluid flow cells of the colorimetric analysis channels 1 through 12, fluid sample streams of known concentration appropriate to the colorimetric analysis for each of the constituents of interest would be flowed through the respective reference fluid flow cells of said colorimetric analysis channels. More specifically, a reference fluid of known concentration appropriate to colorimetric analysis for uric acid would be flowed through reference fluid flow cell 22 of colorimetric analysis channel 1, while a reference fluid of known concentration appropriate to colorimetric analysis for albumin would be flowed through reference fluid flow cell 24 of colorimetric analysis channel 2.

Concomitantly with this flow of the respective blood sample quotient streams and reference fluids through the respective reference and fluid sample flow cells of the provided colorimetric analysis channels 1 through 12, the timing disc 74 will be rotated by motor 70 at, for example, 1,800 rpm to thus result in the sampling of the exit radiation P from each of said flow cells, and the transmission thereof for impingement upon the photomultiplier tube 180, at a rate of 30 times per second. Thus, and considering only the specifically illustrated colorimetric analysis channels 1 and 2, the light from the reference fluid flow cell 22 of colorimetric analysis channel 1, the light from the sample fluid flow cell 26 of colorimetric analysis channel 1 which is, of course, proportional in intensity to the amount of uric acid in the blood sample quotient Su1 then flowing therethrough, the light from reference fluid flow cell 24 of colorimetric analysis channel 2, and the light from sample fluid flow cell 28 of colorimetric analysis channel 2 proportional in intensity to the amount of albumin contained in the blood sample quotient SA1 then flowing therethrough, will be transmitted in that order through the rotating light pipe scanner 160 for impingement upon the photomultiplier tube 180. As a result, the reference and sample output currents $Ir$ and $Is$ from the photomultiplier tube 180, as defined hereinabove by Equation 2, and the resultant reference and sample voltage outputs $Vr$ and $Vs$ from the amplifier 186, as defined hereinabove by Equations 5 and 6, and applied to the common line or bus bar 204 of the recorder means operating circuit means 20, will respectively be directly proportional to the known concentration in the uric acid reference fluid flowing through reference fluid flow cell 22, the uric acid concentration in the blood sample quotient SU1 flowing through sample fluid flow cell 26, the known concentration in the albumin reference fluid flowing through reference fluid flow cell 24, and the albumin concentration in the blood sample quotient SA1 flowing through sample fluid flow cell 28.

Concomitantly with this alternating transmission of light from the respective reference and sample fluid flow cells of colorimetric analysis channels 1 and 2, the rotation at the same 1,800 rpm of the timing disc 74 will be effective to operate the digital logic means 16 to gate the respective sample/hold modules 206, 208, 210 and 212 in appropriate order. More specifically, as the light input end 161 of the light pipe scanner 160 passes through alignment with the light transmission aperture 110 of the stationary disc 106 to thus transmit the light from reference fluid flow cell 22 of colorimetric analysis channel 1 to the photomultiplier tube 180, the digital logic means 16 will be effective to switch sample/hold module 206, only, on line 222 from the sample mode thereof to the hold mode thereof whereby said sample/hold module will hold constant the reference voltage $Vr$ which is indicative of the known concentration in the reference fluid then flowing through reference fluid flow cell 22 and will take the peak level thereof for application as a DC signal to the differential amplifier 230 on line 232.

Subsequently, as the light input end 161 of the light pipe scanner 160 passes through alignment with light transmission aperture 112 of the stationary disc 106 to thus transmit the exit radiation from sample fluid flow cell 26 of colorimetric analysis channel 1 to the photomultiplier tube 180, the like rotation of the timing disc 74 will be effective to operate the logic means 16 to switch the sample/hold module 208, only, on line 224 from the sample mode thereof to the hold mode thereof whereby the peak value of the sample voltage $Vs$ from said amplifier 186 which is indicative of the concentration of uric acid in the blood sample quotient SU1 then flowing through the sample fluid flow cell 26 will be held by said sample/hold module and applied as a DC signal to the differential amplifier 230 on line 234.

In like manner, the digital logic means 16 will be operative to switch sample/hold module 210 from the sample mode to the hold mode thereof only when the output reference voltage $Vr$ from the amplifier 186 is indicative of the known concentration in the reference fluid flowing through reference fluid flow cell 24 of channel 2, and will be operative to switch sample/hold module 210 from the sample mode thereof to the hold mode thereof only when the amplifier output sample voltage $Vs$ is indicative of the concentration of albumin in the blood sample quotient SA1 then flowing through sample fluid flow cell 28 of channel 2 for application, in each instance, of a DC signal of level corresponding to the peak value of the relevant reference and sample voltages, to differential amplifier 236 on lines 238 and 240.

This operation of the read-out means operating circuit means 20 is believed more clearly illustrated by the timing diagram of FIGS. 5A through 5D which may be understood to be drawn to the same time scale and to illustrate the operation of the colorimetric analysis channel 1 portion, only, of the operating circuit means 20 for the colorimetric analysis of the blood sample quotient SU1. More specifically, and as seen in FIG. 5A, the output reference voltage $Vr$ which is applied from the amplifier 186 to said operating circuit in response to the transmission of the exit radiation P from reference fluid flow cell 22 to the photomultiplier tube 180 will consist of a series of spaced pulses as indicated at 270 and for rotation of the light pipe scanner 160 at 1,800 rpm, as discussed hereinabove, these pulses 270 would occur at the rate of 30 per second. The magnitude of each of the pulses 270 is, of course, substantially the same to thus clearly indicate the absence of any variation in the known concentration of the uric acid reference fluid flowing through said reference flow cell.

The waveform of the sample voltage $Vs$ which is applied from the amplifier 186 to the operating circuit 20 in response to the transmission of the exit radiation P from sample fluid flow cell concomitant with the flow of the blood sample quotient SU1 therethrough, to the photomultiplier tube 180 is represented by the spaced pulses 722. A comparison of FIGS. 5A and 5B makes clear that the pulses 272 immediately follow in point of time the pulses 270 due to the sequential arrangement, in the direction of rotation of the light pipe scanner 160, of the respective light transmission apertures 110 and 112 in the stationary disc 106.

As each of the reference voltage pulses 270 is applied on line 214 to the sample/hold module 206, and the latter appropriately switched by the digital logic means 16 from the respective sample to hold modes thereof in synchronism with the application of these pulses thereto, this will result in the holding by said sample/hold module of a substantially constant DC level as indicated at 274 in FIG. 5C, and the application thereof on line 232 as one input to the differential amplifier 230. Conversely, the switching by the digital logic means 16 of the sample/hold module 208 from the sample to the hold mode thereof concomitantly with the application of each of the sample voltage pulses 272 thereto on line 216, will result in said sample/hold module holding a DC level 275 which increases to a substantially constant, peak value as indicated at 276 and decreases therefrom in response to the corresponding increase and decrease in the peak values of the sample voltage pulses 272 in accordance with conventional colorimetric analysis operating characteristics, and the concomitant application of this DC level 275 as the other input to differential amplifier 230 on line 234.

The concomitant application of the DC level 274 of FIG. 5C and the DC level 275 of FIG. 5D to the differential amplifier 230, and operation of the latter in the nature of a subtractor, will result in the provision of a DC signal therefrom to the strip chart recorder 250 on line 258 which is equal to the log of the reference current $Ir$, which flows from the photomultiplier tube 180 as a result of the transmission thereto of the exit radiation P from reference fluid flow cell 22, minus the log of the sample current $Is$, which flows from said photomultiplier tube upon the transmission of the exit radiation P from the sample fluid flow cell 26 thereto. The level of this DC signal will be directly proportional to the difference between the fixed reference signal level as established by the known concentration in the reference fluid flowing through reference fluid flow cell 22 and the concentration of uric acid in the blood sample quotient SU1 flowing through fluid sample flow cell 26. More specifically, and referring again to Equations 5 and 6 as defined hereinabove, it may be understood that this DC output signal from the differential amplifier for analysis channel 1 may be defined as follows:

EQUATION 7.

$$V_1 = V_s - V_2 = KT/Q\,(\log I_s/T_o - \log I_r/I_o) = KT/Q \log I_s/I_r$$

This DC signal from the differential amplifier 230 is, of course, effective to operate the recording pen or stylus 256 of the strip chart recorder 250 to provide a graph on the recorder strip chart 254 which will bear a linear relationship with the uric acid concentration of the blood sample quotient SU1 to thereby enable the use of regular graph paper, rather than log paper, in the formulation of said recorder strip chart, and the more convenient interpretation of the results provided thereon by said recording pen.

The operation of the recorder operating circuit 20 and strip chart recorders for the remaining colorimetric analysis channels 2 through 12 is, of course, substantially identical to that described in detail hereinabove for colorimetric analysis channel 1. More specifically, the flow of each substantially phased group of 12 blood sample quotients from a blood sample through the respective sample fluid flow cells of the colorimetric analysis channels 1 through 12, a graph linearly illustrating the amount of a different constituent of interest of said blood sample will be provided on the strip chart of each of the twelve strip chart recorders which are included in the read-out means 18. These graphs will, of course, be provided in series form for each of said constituents. Thus, for example, and considering for purposes of illustration only the five first analyzed blood samples as depicted in quotient form for colorimetric analysis channels 1 and 2, only, a series of graphs which are respectively representative of the uric acid constituents of the blood sample quotients SU1 through SU5 of these five first analyzed blood samples will be provided on the strip chart 254 of strip chart recorder 250, while a series of graphs indicating the respective albumin constituents of the blood sample quotients SA1 through SA5 of the same five first analyzed blood samples will be provided on the strip chart 260 of the strip chart recorder 258. In like manner, a series of graphs representing a different constituent of interest for each of the remaining blood sample quotients of said blood samples will be concomitantly provided on the remaining 10, non-illustrated strip chart recorders of colorimetric analysis channels 3 through 12. As a result, and assuming the apparatus 10 to include 12 colorimetric analysis channels as described, the analysis of 12 fluid samples and the recording of the results thereof may be accurately effected, through time sharing of the single light sensitive detector means and simultaneous recorder operation as described, in the time normally required for such analysis and result recording for only a single fluid sample, to thus provide for a very significant 1,100 percent increase in the sample analysis rate.

A particular advantage of the use, as described, of a single detector means in a ratio system resides in the fact that the gain of the former can vary throughout a reasonable range without affecting the essential output current ratio in each instance. Too, the use of a photomultiplier tube for such detector means in a high quality ratio system may be understood to advantageously reduce noise to thus enable satisfactory operation over wide dynamic variations of source energy levels.

Figure 6:
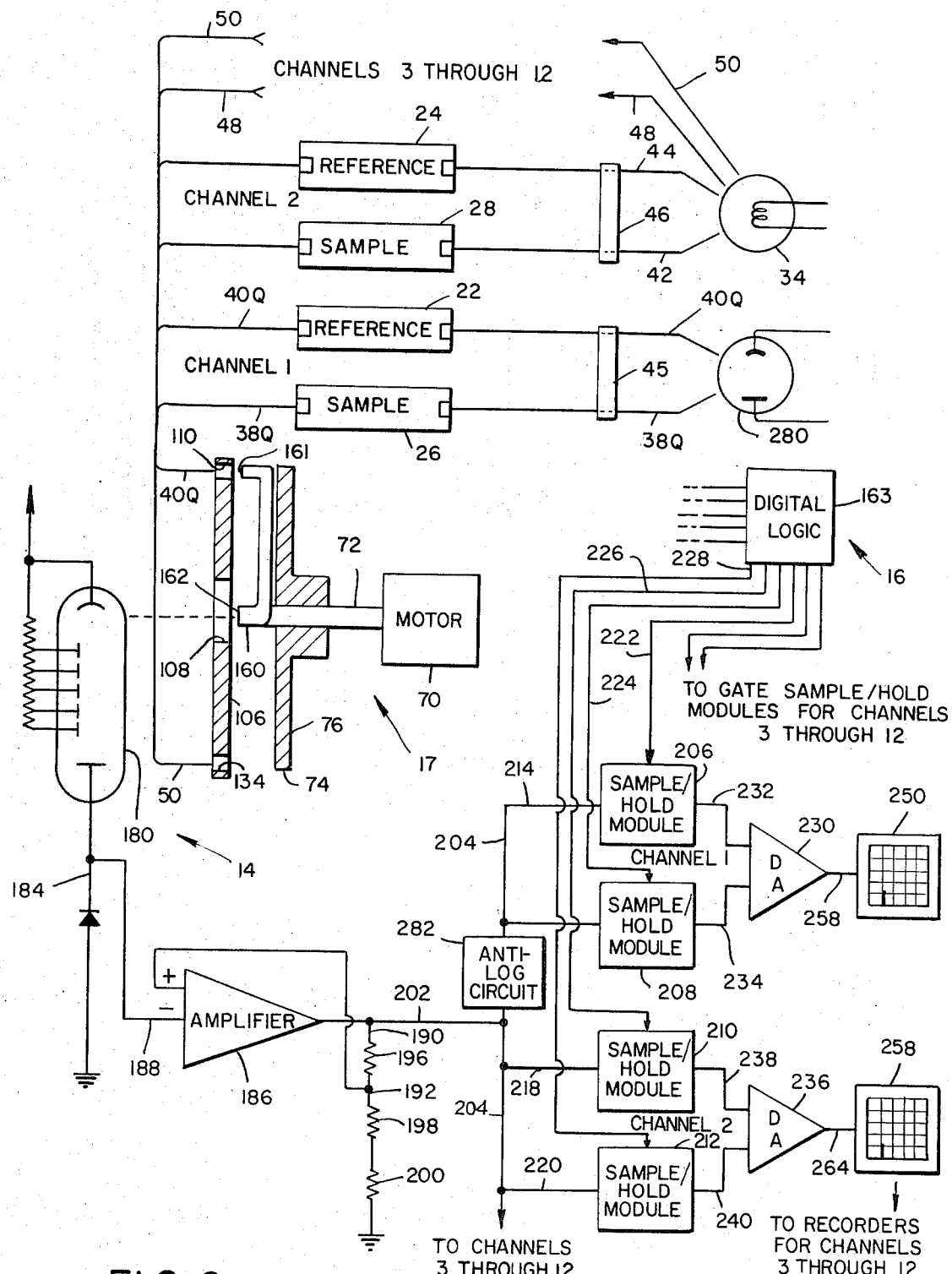
FIG. 6 is a generally schematic diagram of a second embodiment of the apparatus of the invention which is utilizable for simultaneous colorimetric and fluorimetric analysis.

An application of the method and apparatus of the invention to the simultaneous colorimetric and fluorimetric quantative analysis of a series of blood samples which are supplied thereto in the form of 12 phased series of appropriately treated blood sample quotients as discussed hereinabove is illustrated in FIG. 6. More specifically, and if it is assumed that channel 1, only, is to be utilized for the performance of fluorimetric rather than colorimetric analysis for quantitative determination, for example, of a blood sample constituent in the nature of SGPT, it may be understood that an additional radiation source in the nature of a mercury arc source for the provision of the requisite ultra-violet radiation as indicated at 280 will be provided for such fluorimetric analysis. In addition, light pipes of specialized construction as indicated at 38Q and 40Q will be necessary for the transmission of the ultra-violet radiation from said high-voltage mercury arc source to the respective reference and sample flow cells 22 and 26 of the fluorimetric analysis channel 1. Light pipes 38Q and 40Q may, for example, be made from a material having appropriate optical transmission characteristics in the nature of quartz.

The only other change of significance which would be required for the inclusion of a fluorimetric analysis channel 1 as depicted in FIG. 6 would be the inclusion of suitable anti-log circuit means as indicated schematically at 282 in common signal input line 204 of the operating circuit 20 as shown to convert the respective reference and sample amplifier output voltages $V_r$ and $V_s$ which result from the operation of the fluorimetric analysis channel 1 into appropriate form for operation of the strip chart recorder 250 as described hereinabove prior to the application of said voltages to the respective channel 1 sample/hold modules 206 and 208 of the read-out means operating circuit 20 and the subsequent holding of the peak values of said voltages and application thereof as appropriate DC levels to the differential amplifier 230. In the case of fluorimetric analysis, the exit radiation P from the respective sample and reference fluid flow cells 26 and 22 will be directly proportional to the constituent concentration C of interest. Since the log diode provides an output in terms of the absorbance which is not linear with concentration, it becomes necessary to apply this output across anti-log circuit means to return the same to the desired form thereof which is directly proportional to the constituent concentration C of interest for operation of the strip chart recorder 250 as described.

In all respects, the construction and manner of operation of the combined fluorimetric and colorimetric analysis means of FIG. 6 will be substantially identical to that of FIG. 1 with the additional obvious exception that the results provided by recording pen 256 on the strip chart 254 of channel 1 strip chart recorder 250 will, of course, be indicative of the quantity of a constituent of the series of blood sample quotients flowed through sample fluid flow cell 26 as determined by fluorimetric, rather than colorimetric, analysis means.

Figure 7:
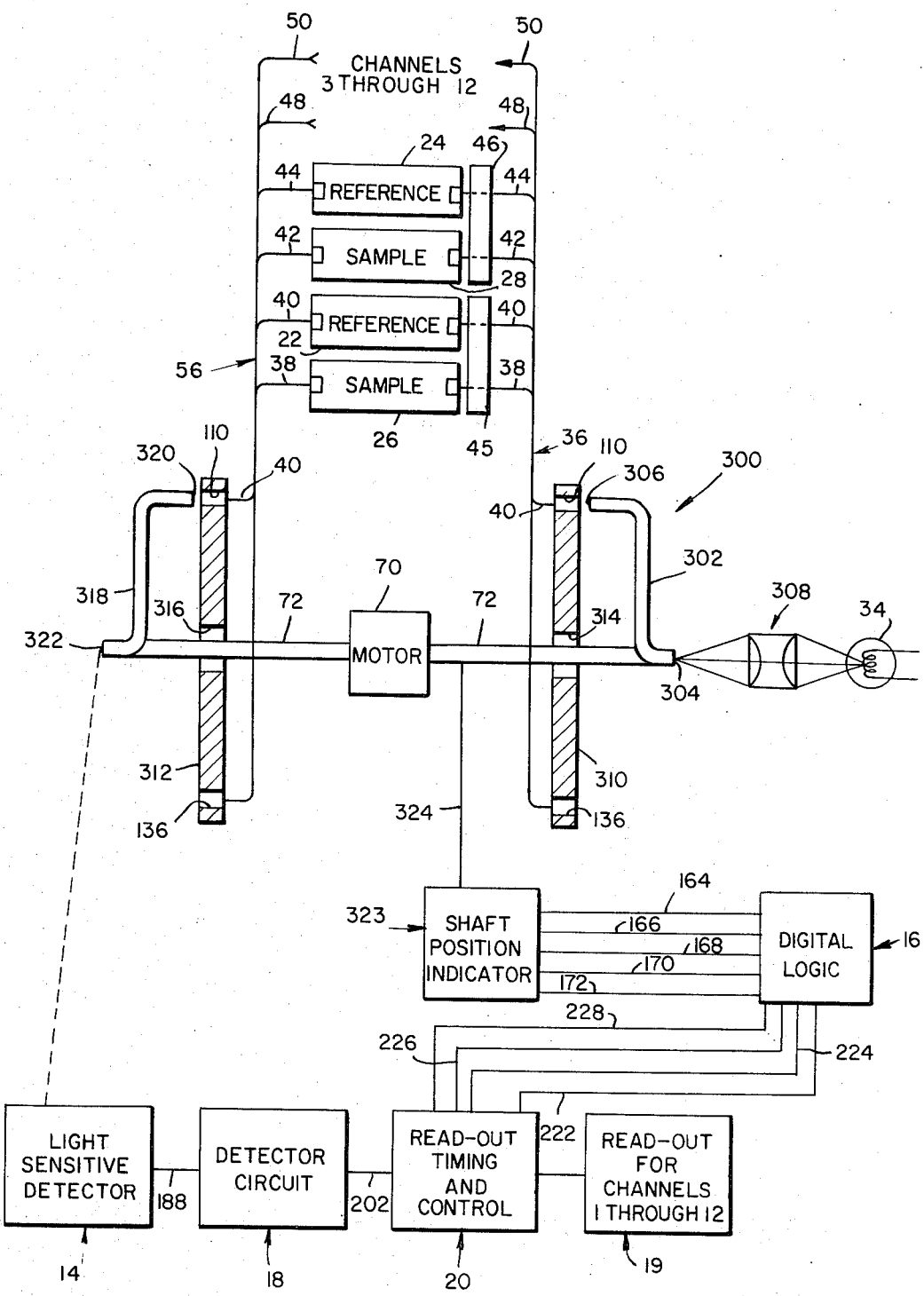
FIG. 7 is a generally schematic diagram of a third embodiment of the apparatus of the invention which enables the operative positioning of single fiber optic or light means, only, relative to the apparatus light source.

Another embodiment of the apparatus 10 of FIG. 1 is indicated generally at 300 in FIG. 7, and it may be understood that like apparatus components bear like reference numerals in each of FIGS. 1 and 7.

Referring now to FIG. 7, it may be seen that the primary distinction of the embodiment 300 resides in the fact that single element light transmission means are utilized therein to effect the transmission of the light from the light source 34 to the respective reference and sample flow cells. More specifically, said light transmission means take the form of a generally Z-shaped light pipe 302, having a light input end 304 and a light output end 306, which is arranged as shown to be supported from and rotatable with one extremity of the shaft 72 of constant speed drive motor 70 and functions, as discussed in greater detail hereinbelow, as a low loss light diffuser. A focusing lens assembly is indicated generally at 308 and is effective to focus the light from the light source 34 to a very fine point for impingement upon light input end 304 and attendant transmission through light pipe 302.

Stationary light transmission directing discs are indicated at 310 and 312, respectively, and for use in a 12 channel system as described, would each take the form of the stationary timing disc 106 as best seen in FIG. 3. More specifically, each of the stationary light transmission directing discs 310 and 312 would include, in the manner of disc 106, a generally circular array of 24 alternating, equally spaced reference and sample light transmission directing apertures formed radially outwardly thereof adjacent the respective disc peripheries. As arranged, the discs 310 and 312 respectively include apertures 314 and 316 found as shown generally centrally thereof to enable the passage of drive motor shaft 72 therethrough, and are, or course, relatively positioned so that the like-numbered pairs of light transmission apertures which are respectively formed therein are in substantial axial alignment as indicated for the pair of light transmission apertures 110, and for the pair of light transmission apertures 136.

A second, generally Z-shaped light pipe is indicated at 318 and comprises a light input end 320 and a light output end 322. As shown, the light pipe 318 is supported from and rotatable with the other extremity of drive motor shaft 72 in substantial alignment with the rotating light pipe 306 so as to be rotatable in synchronism therewith. The light output end 306 of rotating light pipe 302 is, of course, disposed at substantially the same radius as is the circular array of reference and sample light transmission directing apertures in the stationary disc 310; the same is, of course, true for light input end 320 of the rotating light pipe 310 and the circular array of apertures in stationary disc 312. In addition, light output and input ends are respectively disposed as closely as practicable to the relevant stationary disc surfaces to maximize light transmission efficiency as should be obvious. By this construction, rotation of shaft 72 will effect synchronized scanning of the respective aligned pairs of light transmission apertures of the stationary light transmission directing discs 310 and 312 by the respective light output end 306 of rotating light pipe 302 and the light input end 320 of rotating light pipe 318.

The respective light input ends of the 24 light pipes which constitute the fiber optic bundle 36 are, of course, arranged so that a different one of the former extends in proper sequence as indicated into light transmitting relationship with the appropriate one of the reference and sample light transmission directing apertures in the stationary disc 310; the relationship between the respective light output ends of these light pipes as reformed into the fiber optic bundle 56 and the respective reference and sample light transmission apertures of the stationary disc 312 is the same as described hereinabove with reference to FIGS. 1 and 3.

Shaft position indicator means are indicated schematically at 323 and are operatively associated as indicated by line 324 with drive motor shaft 72. The shaft position indicator means 323 preferably take any suitable, readily commercially available or "off-the-shelf" self-contained form and, as such, may for example include a built-in light source. As utilized in the apparatus 300 of FIG. 7, the shaft position indicator means 323 function, of course, in the manner of the detector and logic means timing and control means 17 of the apparatus 10 of FIG. 1 to clearly indicate at any point in time to the digital logic means 163 the identity of the reference or sample flow cell through which the light from light source 34 which is them impinging on the light sensitive detector means 14 has passed. To this effect, said shaft position indicator means may be connected to said digital logic means as again indicated by lines 164, 166, 168, 170 and 172 extending therebetween.

The respective light sensitive detector means 14, detector circuit means 18, read-out timing and control means 20 and read-out means 19 of FIG. 7 are substantially the same as described in detail hereinabove with regard to FIG. 1, and are accordingly illustrated in simple block form in FIG. 7.

The operation of the apparatus 300 of FIG. 7 is substantially the same as that of the apparatus 10 of FIG. 1 with the former functioning as described, through the flow cell scanning function provided by the synchronized driven rotation of rotating light pipes 302 and 318, to pass the light from light source 34 in predetermined sequence through the respective reference and sample flow cells for sequential impingement upon the light sensitive detector means 14 and attendant provision of the recorded sample analysis results of interest on the respective strip charts of the strip chart recorders which make up the read-out means 19.

Of particular advantage with regard to the apparatus 300 of FIG. 7 is the increased optical power density or light energy transmitted to the respective flow cells through the focusing of the light from the light source 34 at a very fine point at the light input end 304 of rotating light pipe 302. In addition, and for use with a relatively large number of analysis channels and with a light source 34 of relatively limited surface area, the apparatus 300 will render unnecessary the somewhat difficult operative arrangement of the light input ends of a large number of light pipes relative to said limited light source surface area and will, in addition, remove the attendant possibility of light source overheating. Too, the use of the rotating, internally reflective light pipes 302 and 318 and the focusing of the light from source 34 as a very fine point at the light input end of light pipe 302 will result in the function of said light pipe as a very low loss diffuser to substantially minimize electronic noise as might otherwise result from operational vibration of the light source filament and/or variation in positional sensitivity of the photomultiplier tube photo cathode.

Figure 8:
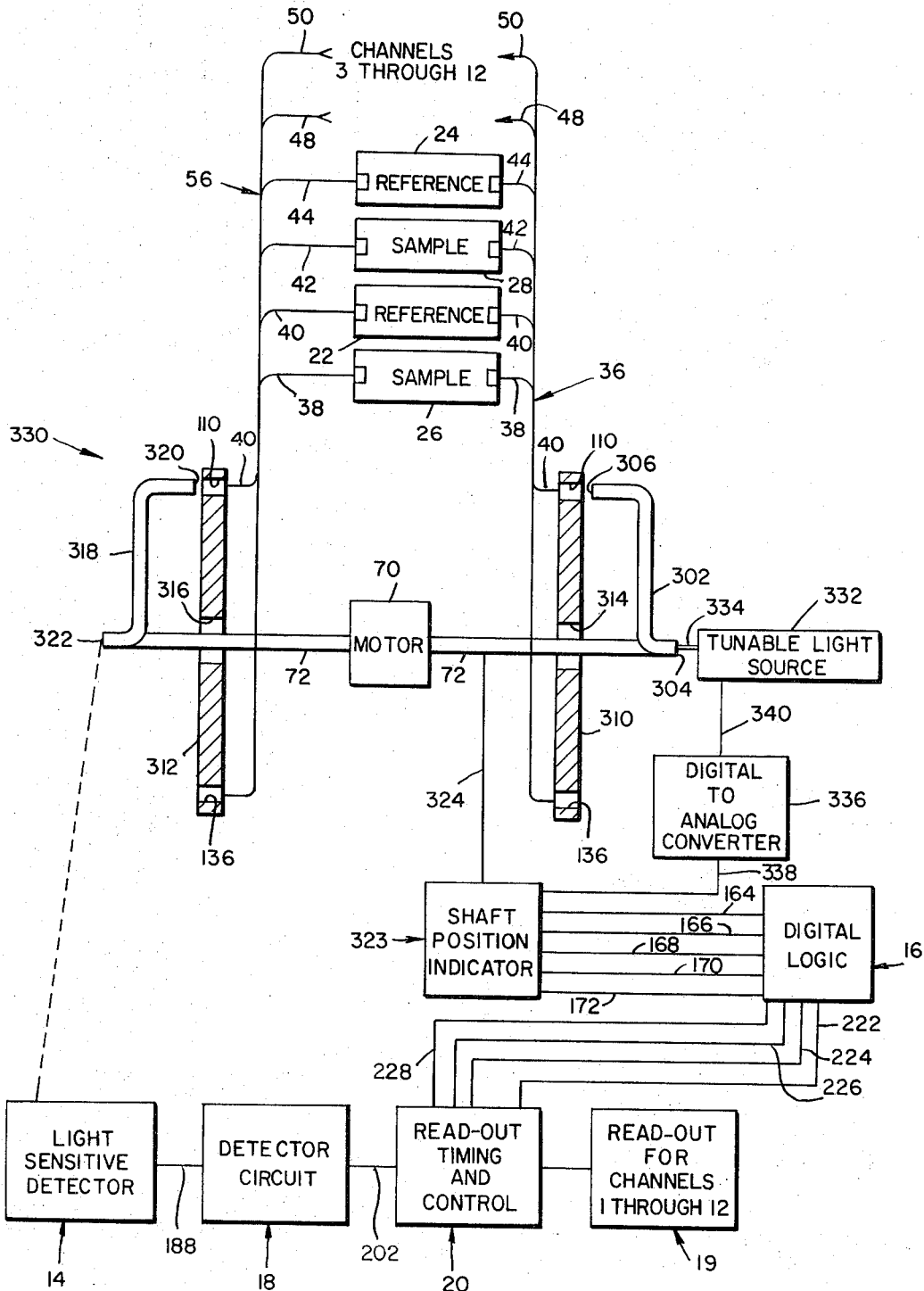
FIG. 8 is a generally schematic diagram of a fourth embodiment of the invention wherein the light source is constituted by a turnable light source.

A further embodiment of the apparatus 10 of FIG. 1 is indicated generally at 330 in FIG. 8, and it may be understood that like apparatus components again bear like reference numerals in FIGS. 1, 7 and 8.

Referring now to FIG. 8, it may be seen that the primary distinction of the apparatus 330 as compared to the apparatus 300 of FIG. 7 resides in the fact that the former utilizes a tunable light source to enable appropriate variation in the wavelength of the emitted light in accordance with the particular colorimetric analysis characteristics of each of the included analysis channels. More specifically, a tunable light source is indicated at 332 in FIG. 8 and may, for example, take the form of a tunable optical parametric oscillator as described in detail in the article "Tunable Optical Parametric Oscillators" by S. E. Harris as appeared in the December 1969 issue of the Proceedings Of The IEEE, which operates to emit a high intensity beam of highly collimated, monochromatic light as indicated at 334, the wavelength of which is precisely tunable or variable through appropriate control, for example, of temperature or angle of the included KDP crystal, or through electro-optical tuning thereof. Alternatively, said tunable light source may, for example, take the form of a tunable laser, the wavelength of the emitted light beam 334 therefrom is again precisely tunable or variable as through the use of appropriate thermal, magnetic or electrostatic tuning means.

Digital to analog converter means are indicated at 336 and are respectively operatively connected to each of the shaft position indicator means 323 and the tunable light source 332 as indicated by lines 338 and 340. As utilized in the apparatus 330, the digital to analog converter means 336 function to effect the appropriate tuning of the tunable light source 332 by conversion of the digital information from shaft position indicator means 323 to analog form and the application thereof to said tunable light source to tune the latter in accordance with the position of shaft 72 (and thus in accordance with the analysis channel then operating), and insure that the wavelength of the emitted light beam 334 is appropriate in each instance to the colorimetric analysis characteristics of the analysis channel then operating. More specifically, and assuming as discussed hereinabove that channel 1 is to be utilized for uric acid determination and channel 2 is to be utilized for albumin determination, each time the light output end 306 of rotating light pipe 306 scans stationary disc aperture 112 to thus pass the light beam 334 through sample fluid flow cell 26, the wavelength of said light beam will be automatically tuned or varied, under the control of shaft position indicator means 323 and digital to analog converter means 336, to assume a value which is appropriate to colorimetric quantitative analysis of a fluid sample with regard to the uric acid constituent thereof. In like manner, every time said rotating light pipe light output end scans stationary disc aperture 116 to pass said light beam through sample fluid flow cell 28, the wavelength of said light beam tuned or varied to assume a value which is appropriate to colorimetric quantitative analysis of a fluid sample with regard to the albumin constituent thereof. Like variation or tuning of the wavelength of the light beam 334 is, of course, effected for each of the ten remaining colorimetric analysis channels.

A particular advantage of the use of a tunable light source 332 as described resides in the fact that such makes possible the significant simplification of the optical system by enabling the complete elimination of all of the optical filters—as illustrated at 45 and 46 for analysis channels 1 and 2, only, in FIG. 1—since the function thereof is now automatically performed by said tunable light source, and by enabling the elimination of the focusing lens assembly 308 since the increased intensity and highly collimated and monochromatic nature of the light beam 334 render the same unnecessary. Of additionally significant advantage with regard to the use of the tunable light source 332 is the fact that the high intensity of the light beam 334 significantly increases the optical power input into the respective flow cells, and the respective optical power outputs therefrom, to thus materially increase the overall signal to noise ratio of the system and thus provide for more accurate analysis results. Too, this increase in optical power could enable the advantageous use of somewhat simpler and less expensive solid state photodetector means instead of a photomultiplier tube as the light sensitive detector means 14 and could, in addition, enable advantageous reduction in the amount or range of chemical color development required for satisfactory colorimetric analysis of each of the fluid samples of interest to thus advantageously reduce the extent of the pre-analysis fluid sample treatment that is required in each instance.

Of further significant advantage with regard to the use of the tunable light source 332 is the fact that the same enables the simultaneous performance of colorimetric and fluorimetric analysis through the use of a single light source. More specifically, and realizing that the wavelength of the emitted light beam 334 may be precisely and automatically varied or tuned as described through the visible and ultra-violet ranges, one or more, as desired, of the fluid sample analysis channels 1 through 12 may be utilized for fluorimetric rather than colorimetric analysis through appropriate tuning of said tunable light source concomitant with the scanning of said fluid sample analysis channel or channels. An additional requirement for such use of the apparatus 330 would, of course, involve the provision of suitable anti-log circuit means as indicated at 282 in FIG. 6 at appropriate locations in the read-out means timing and control means 20 of the apparatus 330.

Although for purposes of insuring fullness and clarity of description, disclosed hereinabove as comprising a reference fluid flow cell and a sample fluid flow cell for each of the included fluid analysis channels, it may be understood that said reference fluid flow cells may, in each instance, be eliminated, and that the function thereof in providing an appropriate reference current Ir output from the light sensitive detector means for each of the analysis channels may be performed instead through the use of a stationary light transmission directing disc having appropriately sized reference light transmission apertures.

A stationary light transmission directing disc of this nature is indicated at 350 in FIG. 9 and, for use as described with 12 channel analysis apparatus, may be seen to include 12 sample light transmission directing apertures, as again indicated at 112, 116, 120, 124, 128, 132, 136, 140, 144, 148, 152 and 156, respectively, which alternate as shown with reference light transmission directing apertures as indicated at 352, 354, 356, 358, 360, 362, 364, 366, 368, 370, 372 and 374, respectively, with each of the latter preferably being adjustable as indicated to vary the amount of light transmitted therethrough for impingement on the light sensitive detector means 14 and thus enable the provision in each instance of a reference current $Ir$ output from said detector means which is appropriate to colorimetric analysis for the constituent of interest in the relevant analysis channel.

For use of the stationary light transmission directing disc 350 in the apparatus 10 of FIG. 1, the former would replace the stationary disc 106 with attendant elimination of the 12 reference fluid flow cells and the re-arrangement of the 12 light pipes or fiber optics in the nature of 38 and 42—which had functioned to transmit the light from light source 34 to said reference fluid flow cells—to, in each instance, transmit the light from said light source directly to the respective reference light transmission directing apertures 352 through 374. In all other respects, operation of the apparatus 10 would be as described.

This is believed made clear by FIG. 10 wherein the stationary light transmission directing disc 350 is depicted in operative relationship with the relevant components of the apparatus 10 of FIG. 1 (although said disc is sectioned to show both a sample light transmission aperture 112 and an adjustable reference light transmission aperture 364 in the manner indicated by line S-R in FIG. 9), and the reference light transmission light pipes or fiber optics as indicated at 366 are depicted as re-arranged to transmit the light from light source 34 directly to the adjustable reference light transmission apertures 352 through 374.

For use of the stationary light transmission directing disc 350 in either of the apparatus embodiments 300 of FIG. 7 or 330 of FIG. 8, two of the same would be utilized to replace the respective stationary light transmission directing discs 310 and 312 with attendant elimination of the 12 reference flow cells and of the respective 12 light pipes utilized to transmit light therethrough, and probable re-arrangement, if necessary, of said stationary discs 350 to bring the same into closer proximity and enable the effective transmission of light between the respective pairs of aligned, adjustable reference light transmission apertures without requiring the use of fiber optics. In all other respects, operation of the apparatus 300 of FIG. 7 and the apparatus 330 of FIG. 8 would be as described.

Figure 11:
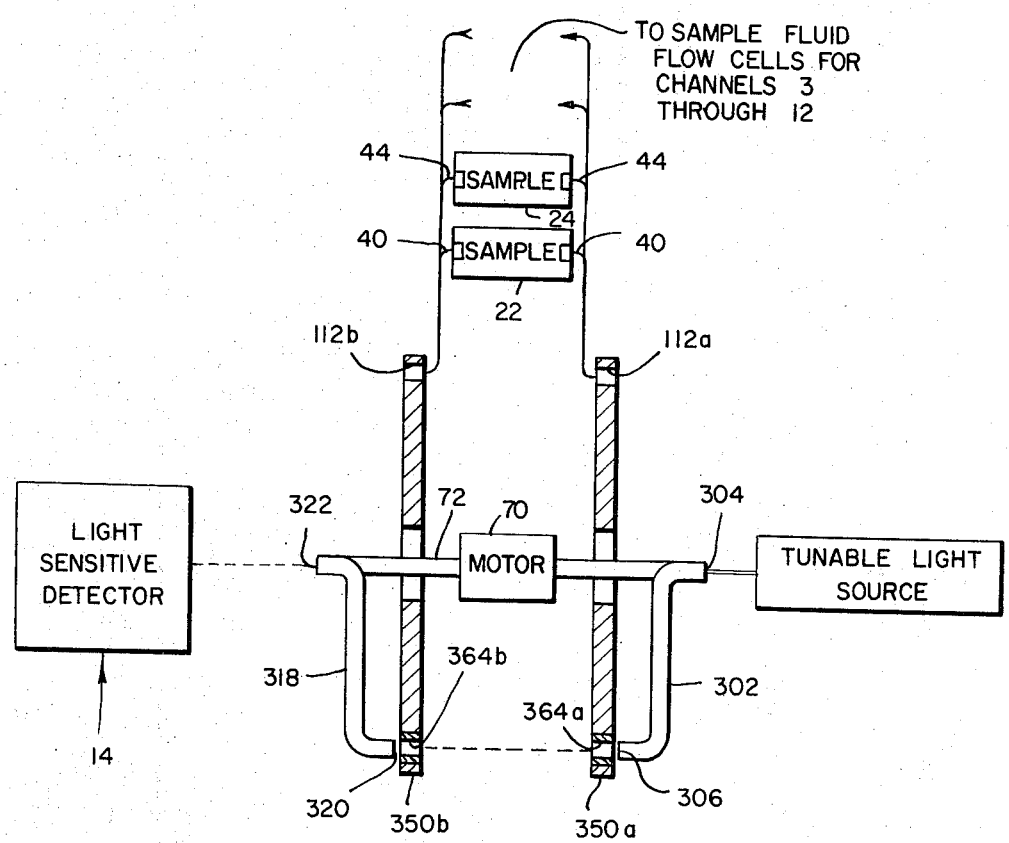
FIG. 11 is a generally schematic diagram of the apparatus of FIG. 8 utilizing the modified form of the stationary light transmission directing disc of FIG. 9.

Such an arrangement is illustrated in FIG. 11 which depicts two stationary light transmission directing discs, as indicated at 350a and 350b in operative relationship with the relevant components of the apparatus 330 of FIG. 8 (and again sectioned along line S-R of FIG. 9), and makes clear the elimination of the reference light transmitting light pipes or fiber optics of interest and the arrangement of the discs 350a and 350b in relatively close proximity to enable the transmission of the light beam 334 directly between the respective aligned pairs of reference light transmission apertures as indicated by the dashed line extending between apertures 364a and 364b. Alternatively, suitable, substantially straight light pipes may be employed, if necessary, to effectively transmit the light between said aligned reference light transmission aperture pairs.

Of additionally significant advantage with regard to the hereinabove disclosed embodiments of the method and apparatus of the invention is the fact, as discussed hereinabove, that the same enable the respective disposition of the reference and sample flow cells, the colorimetric and/or fluorimetric analysis components, and essential operating electronics, at optimum locations relative to the fluid sample supply and treatment apparatus with which the same are operatively associated. More specifically, in accordance with conventional prior art practice as well understood by those skilled in this art, the colorimeteter flow cells have been mounted with the colorimeter to require the pumping of the fluid sample quotients to be analyzed, from the manifold of the fluid sample supply and treatment apparatus to said flow cells, and the routing of the electrical output signals from said colorimeters to the operating electronics for operation of the provided read-out means.

This general flow cell—colorimeter—read-out means—read-out means operating electronics arrangement of the prior art enhance the probability of errors in the operation of the prior art apparatus from both hydraulic and electrical standpoints. More specifically, with regard to the prior art apparatus hydraulics, this disposition of the flow cells on the colorimeter and spaced from the sample supply and treatment means requires generally long hydraulic lines to connect the same, with resultant difficulty in providing for proper wash of said lines between successive fluid sample quotients, the necessity for undesirable higher fluid sample supply and treatment means pressure drops, and unduly long hydraulic delay times. From the electrical standpoint, the relatively long electrical paths between the colorimeter and the read-out means operating electronics which result from the spaced disposition thereof, has proven similarly undesirable in that the necessary interfacing of relatively high impedance photo-detector means with read-out means operating electronics through the use of realtively long connecting cables meeting the relatively high impedance requirements results in considerable electronic noise and high apparatus production costs.

These disadvantages of the prior art apparatus can be substantially alleviated by use of the teachings of the flow cells directly on the fluid sample supply and treatment means manifold and the routing of the requisite light inputs thereto and light outputs therefrom from and to the relevant, remotely disposed colorimeter and electronic components. Such an arrangement is depicted by way of example in FIG. 12 wherein the manifold of fluid sample supply and treatment means of the nature discussed hereinabove is indicated schematically at 284; while the remainder of the colorimetric analysis means 12, and the light sensitive detector means 14, the digital logic means 16, the detector and logic means timing and control means 17, the detector circuit means 18, the read-out means 19, and the read-out means operating circuit 20, all as depicted specifically in FIG. 1, are depicted schematically as a group at 286. Although intended in the manner of FIG. 1 and FIG. 6 to depict 12 channels apparatus, only the respective reference and sample fluid flow cells 22, 24, 26 and 28 are specifically depicted in FIG. 7. An additional 20 flow cells would, of course, be provided for the provision of the additional colorimetric analysis channels 3 through 12.

Figure 12:
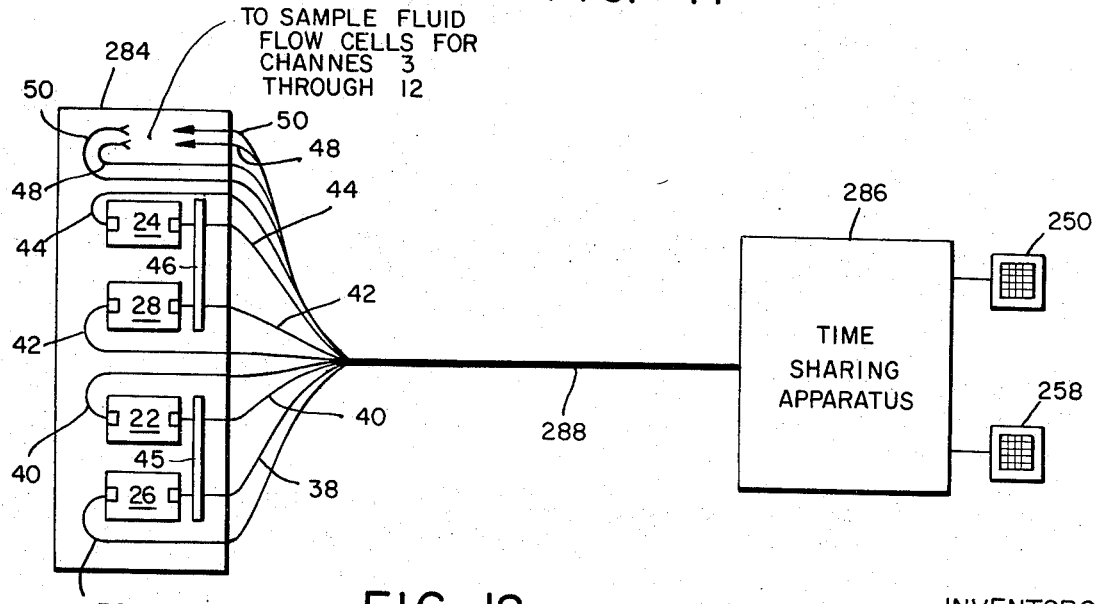
FIG. 12 is a generally schematic diagram of an advantageous application of the apparatus of FIG. 1 or FIG. 6 for use with automatically operable fluid sample treatment and supply means.

For use as illustrated in FIG. 12, the respective light pipes 38, 40, 42 and 44, and the remaining not specifically illustrated light pipes would, of necessity, be somewhat elongated as shown. However, the compact arrangement of these light pipes as illustrated into a single, substantially compact light pipe bundle 288 would make possible the convenient and uncomplicated disposition thereof with minimal space requirements and physical interference with the remainder of the apparatus components.

Although disclosed hereinabove by way of example, only, as applied to colorimetric and/or combined colorimetric and fluorimetric analysis apparatus having 12 distinct though simultaneously operable analysis channels for the simultaneous analysis of 12 appropriately treated quotients of each of a series of blood samples supplied thereto, the apparatus of the invention can, of course, include a greater or lesser number of simultaneously operable analysis channels. Too, the disclosed analysis channel scanning rate of 30 times per second may be understood to have been provided by way of example, only, and other and different scanning rates could be used, while variation in the disclosed sequence of analysis channel scanning may, of course, be made as desired.

Although the apparatus of the invention are disclosed hereinabove as comprising read-out means 19 which are constituted by null balance type, D.C. strip recorders as indicated, for example, at 250 and 258 in FIG. 1, other and different read-out devices in the nature, for example, of A/D read-out means or A/D converter means which feed directly to appropriate computer means for analysis results processing and possible diagnostic use thereof, may be utilized to constitute said read-out means 19.

In addition, the construction and manner of operation of the apparatus of the invention is equally well adapted to the analysis of fluid samples other and different than blood samples. Such other and different fluid samples might, for example, take the form of water samples which are to be tested for purity with regard to a number of different constituents thereof or, with suitable flow cell modification, could take the form of air or other gaseous samples which are to be analyzed with regard to a plurality of the constituents thereof.

While we have shown and described the prefered embodiment of our invention, it will be understood that the invention may be embodied otherwise than as herein specifically illustrated or described, and that certain changes in the form and arrangement of parts and in the specific manner of practicing the invention may be made withot departing from the underlying idea or principles of this invention within the scope of the appended claims.

What is claimed is:

1. In a ratio system for the time sharing of multiple channel sample analysis means comprising a plurality of sample flow cells included in a corresponding plurality of sample analysis channels, each of said sample flow cells containing a portion of a fluid sample to be analyzed with respect to a particular constituent, reference flow cells included in selected ones of said analysis channels, means for optically scanning said sample flow cells and said reference flow cells, in turn, means including a single light sensitive detector means responsive to said scanning means for sequentially providing sample signals indicative of the respective concentrations of the particular constituents being analyzed in said sample flow cells and reference signals obtained by the scanning of said reference flow cells, means for comparing each of said sample signals and an appropriate reference signal to provide ratio signals indicative of the respective concentrations of each of said constituents in said fluid sample, and means for recording said ratio signals.

2. In a ratio system as in claim 1 wherein, said scanning means comprise means to transmit light energy through each of said sample flow cells and said reference flow cells, and means to transmit said light energies from said sample flow cells and reference flow cells for sequential impingement on said single light sensitive detector means.

3. In a ratio system as in claim 2 wherein, said single light sensitive detector means comprise a single photomultiplier tube having a single log diode operatively associated therewith and across which the output from said photomultiplier tube is applied to result in said reference and sample signals, and further comprising, temperature stabilized means operatively associated with said single log diode and operable to render said comparison between said reference and sample signals, substantially independent of ambient temperature changes.

4. In a ratio system as in claim 2 wherein, said means to transmit light energy through each of said sample flow cells and through each of said reference flow cells comprise a single light energy source, fiber optic means to transmit said light energy from said source to and through said sample flow cells and reference flow cells to light transmission directing means, said scanning means being operatively associated with said light transmission directing means and operable to scan the latter and sequentially transmit said light energies therefrom to said light sensitive detector means.

5. In a ratio system as in claim 4 wherein, said scanning means comprise a rotating light pipe.

6. In a ratio system as in claim 4 wherein, said light transmission directing means comprise a disc having a generally circular array of generally equally spaced light transmission directing apertures formed therein and corresponding to each of said sample flow cells and said reference flow cells, and said scanning means comprise a rotating light pipe the light input end of which is operable to scan said array of light transmission directing apertures and the light output end of which is operable to sequentially transmit the light energies passing through each of said light transmission directing aperture to said light sensitive detector means.

7. In a ratio system as in claim 2 wherein, said scanning means comprise a single light energy source, first and second light transmission directing means, first scanning means to transmit said light energy from said source to said first light transmission directing means, fiber optic means to transmit said light energy from said first light transmission directing means to and through said sample flow cells and said reference flow cells to second light transmission directing means, and second scanning means operatively associated with said second light transmission directing means and operable to scan the latter and sequentially transmit said light energies therefrom to said light sensitive detector means.

8. In a ratio system as in claim 7 wherein, said first and second scanning means respectively comprise rotating light pipes which are rotatable in substantial synchronism.

9. In a ratio system as in claim 7 wherein, each of said first and second light transmission directing means, respectively, comprise discs having generally circular arrays of generally equally spaced light transmission directing apertures formed therein, there being one sample light transmission directing aperture and one reference light transmission directing aperture formed in each of said discs corresponding to each of said sample flow cells and said reference flow cells, said first scanning means comprises a rotating light pipe the light input end of which is effective to receive said light energies from said light energy source and the light output end of which is effective to scan said light transmission directing apertures of said first light transmission directing disc to sequentially transmit said light energies to said fiber optic means, and said second scanning means comprise a light pipe which is rotatable in substantial synchronism with said first light pipe and the light input end of which is effective to scan said light transmission directing apertures of said second light transmission directing disc to sequentially transmit the light energies therefrom to said light sensitive detecting means from the light output end of said rotating light pipe.

10. In a ratio system as in clam 2 further comprising a tunable light energy source, and means operatively associated with said scanning means and operable to vary the wavelength of the light energies emitted from said tunable light energy source in accordance with the particular one of said sample flow cells and said reference flow cells then being scanned by said scanning means.

11. In a ratio system as in claim 2 further comprising sample supply and treatment means having a manifold, at least said sample flow cells being disposed on said manifold.

12. In a ratio system as in claim 11 wherein, said light sensitive detector means are disposed remotely of said manifold, and said means to sequentially transmit light energy through each of said sample flow cells and said reference flow cells further comprise light source means disposed remotely of said manifold, and fiber optic means to transmit said light energy from said light source means to and through said sample flow cells and said reference flow cells, in turn, and therefrom to said remotely disposed light sensitive detector means.

13. In a ratio system as in claim 12 wherein, said light source means comprise a single light energy source.

* * * * *